Feb. 23, 1937.        C. C. FARMER        2,071,736
DUST GUARD
Filed July 24, 1934

INVENTOR
CLYDE C. FARMER.
BY Wm. W. Cady
ATTORNEY

Patented Feb. 23, 1937

2,071,736

UNITED STATES PATENT OFFICE 2,071,736

DUST GUARD

Clyde C. Farmer, Pittsburgh, Pa., assignor to The Westinghouse Air Brake Company, Wilmerding, Pa., a corporation of Pennsylvania Application July 24, 1934, Serial No. 736,673

2 Claims. (Cl. 286—6)

This invention relates to dust guards employed in car journal boxes for preventing access of foreign material to the interior of the journal box and to the axle bearing, and has for its principal object to provide a dust guard having improved sealing characteristics.

Another object of my invention is to provide a dust guard which may be manufactured at relatively low cost and which effectively prevents access of foreign material such as dust or dirt to the axle bearing regardless of relative movement of the parts or of wear.

In my co-pending application Serial No. 683,336, filed August 2, 1933, now Patent No. 1,969,787, issued August 14, 1934, and assigned to the assignee of this application, I disclose a one-piece dust guard of resilient molded material having a central opening through which the axle is adapted to extend, the periphery of the central opening being constituted by an inwardly tapered resilient lip which is biased radially outward by the axle and which presses firmly in sealing relation against the axle to exclude foreign particles. The axial width or depth of the dust guard is such as to permit the guard to loosely slide into the supporting slot of the journal box casing. I have found that dust or dirt particles enter the bearing chamber of the journal box by passing through the crevices between the dust guard and the walls of the slot, thereby by-passing the seal of the annular lip surrounding the axle.

My present dust guard constitutes an improvement over the dust guard, disclosed in my prior co-pending application, in that it is adapted to be axially compressed when in the journal casing slot, additional sealing surfaces being provided on the dust guard which cooperate with the walls of the slot in the journal box in which the dust guard is positioned, for preventing the entry of dust or dirt particles into the interior of the journal box by by-passing the seal at the axle.

Figure 1:
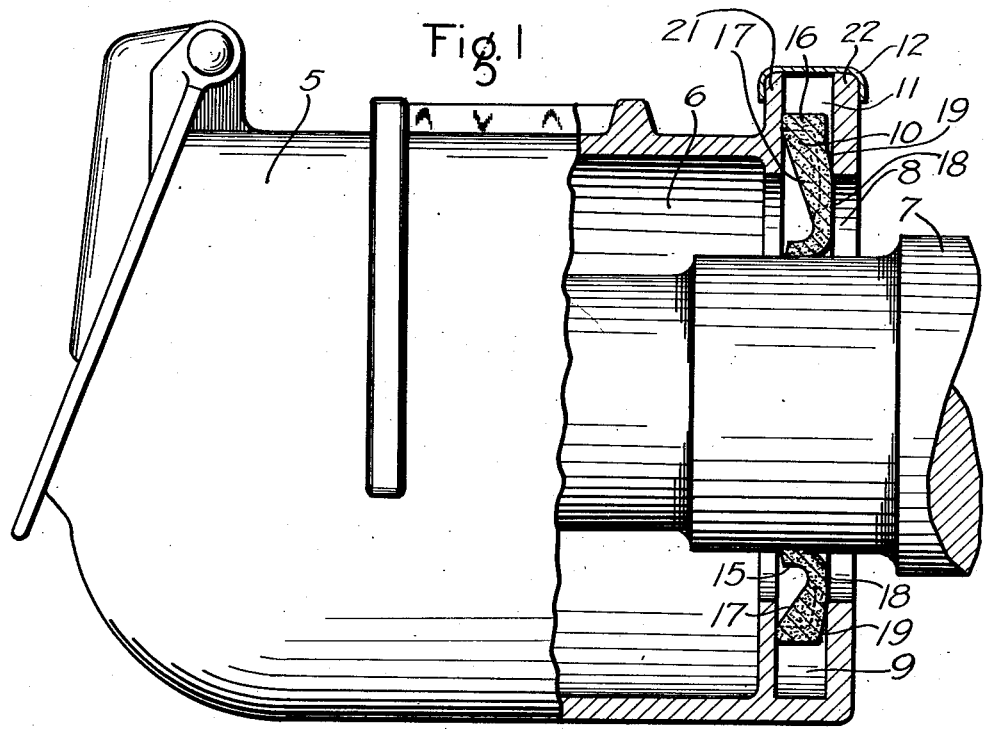
Figure 2:
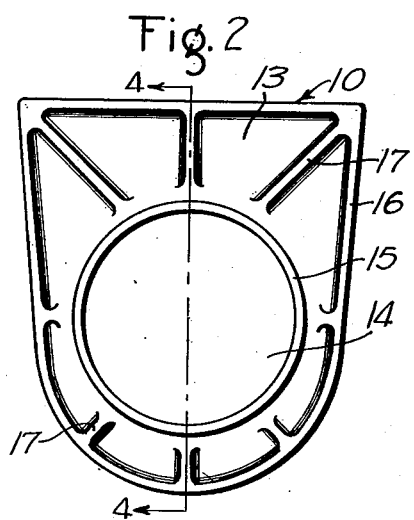
Figure 3:
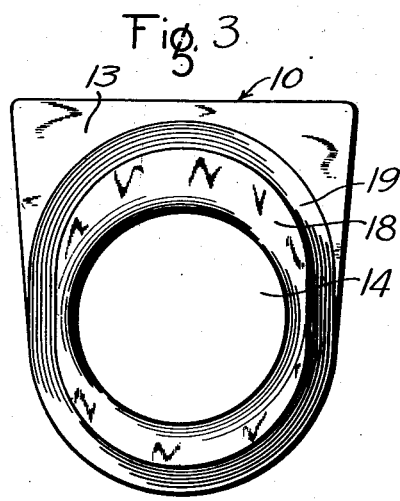
Figure 4:
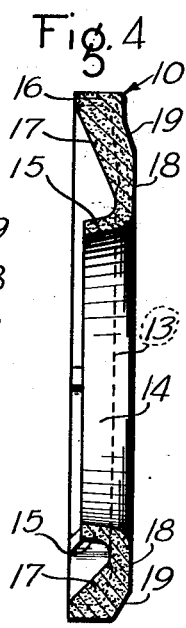

The above and other objects and advantages of the improved dust guard, constituting my present invention, are attained by means of one embodiment thereof, which is hereinafter described and which is illustrated in the accompanying drawing, wherein, Figure 1 is an elevational view of a car journal box, partially in section, showing my improved dust guard in position therein, Figures 2 and 3 are views in reduced scale of opposite sides, respectively, of my improved dust guard, while in the free or non-assembled condition thereof, and Figure 4 is an enlarged sectional view, taken on line 4—4 of Figure 2.

My improved dust guard may be employed in connection with any type of car journal box. It is shown as assembled in connection with a journal box having a casing 5 containing a bearing chamber 6 into which the car-wheel axle 7 extends through an opening 8 in the inner end of the casing. The inner end of the casing 5 is provided with a vertical slot 9 for receiving the dust guard 10, through the upper end opening 11 thereof, a suitable cap member 12 being provided for closing the opening 11, which cap member may be constructed, for example, of sheet steel or other sheet metal.

Referring particularly to Figures 2, 3, and 4, the dust guard 10 is preferably of some resilient material, such as rubber composition, molded in the form of a dished bell-shaped member having a relatively thin base portion or section 13 which has a circular opening 14 extending therethrough, through which the axle 7 is adapted to extend. Surrounding the opening 14 is an annular lip or flange 15, integrally molded with the base section 13, which lip tapers radially inwardly in the manner of a truncated cone, so that when the axle extends through the opening, the lip is biased outwardly into a cylindrical contour, as shown in Figure 1, the resiliency of the lip causing it to bear tightly in sealing relation against the axle. The lip 15 is made sufficiently thick so that even though the surface thereof, which contacts the axle is worn by friction, the lip still continues to press firmly in sealing relation against the axle.

In order to provide a desired stiffness and rigidity, and at the same time enable a relatively light weight guard to be obtained, an outer peripheral flange 16 extending to one side of the base section 13 is provided, which flange is integrally molded with the base section 13, and also a plurality of reenforcing ribs 17, extending radially of the opening 14 and integrally uniting the projecting portion of the flange 16 and the base section 13 in supporting relation. The ribs 17 terminate short of the inner peripheral lip 15 so that while the base portion of the dust guard is rendered relatively stiff and rigid, the resiliency of the lip is retained.

The face of the base section 13, opposite to that having the ribs 17 united therewith, is formed with a flat sealing face 18 of elongated contour, which is perpendicular to the axis of the dust guard, and which merges into the outer peripheral portion of base section 13 through a slightly inclined or tapered face 19.

The axial thickness or depth of the dust guard, relative to the width of the slot 9, is such that the guard is axially compressed as it is inserted into the slot. When the dust guard is positioned in the vertical slot 9, as shown in Figure 1, the flat vertical edge of the outer peripheral flange 16 presses in sealing relation against one wall 21 of the vertical slot 9 and the sealing face 18 presses in sealing relation against the opposite wall 22 of the slot 9. The axial compression of the dust guard will be noted by a comparison of Figure 1 and Figure 4, the end of the sealing lip 15 being closer to the plane of the sealing edge of the flange 16 in Figure 1 than in Figure 4. Figures 1 and 4 have been drawn to slightly exaggerate the extent of the axial compression in order to render this characteristic of my present dust guard more readily apparent.

It will thus be observed that the sealing relation of the sealing face 18 against the wall 22 and that of the sealing edge of the outer peripheral flange 16 against the wall 21 provide two seals, in series, against the influx of dust or dirt particles into chamber 6 through the opening 8, the two seals being in parallel relation to the seal effected by the lip 15 against the axle 7. I have found that where such seals are not provided, dust or dirt particles by-pass the seal at the axle and enter the bearing chamber 6 through the crevices between the base section of the dust guard and the walls of the vertical slot 9. By providing the dust guard with sealing surfaces cooperating with the walls of the vertical slot into which the dust guard is inserted, the possibility of the entrance or influx of dust or dirt particles into the journal bearing chamber 6 is greatly minimized and the efficiency of the seal effected by the dust guard greatly increased.

It will also be observed that by providing the flat metal cap member 12 for the opening 11 of the vertical slot 9, free upward movement of the dust guard in the slot 9 is permitted upon wear of the axle bearing and upward movement of the axle relative to the journal casing caused thereby. Furthermore, due to the compression of the dust guard the flange 16 and sealing face 18 continue to maintain their seal regardless of the upward movement of the dust guard in the slot.

It is understood that the dust guard, constituting my present invention, is capable of various changes, omissions or additions without departing from the spirit thereof, and it is, therefore, not my intention to limit the scope of my present invention to the specific embodiment as illustrated or otherwise than is necessitated by the prior art and the terms of the appended claims.

Having now described my invention, what I claim as new and desire to secure by Letters Patent, is:

1. A one-piece non-metallic dust guard for a car journal box, comprising a resilient body having an opening therein for receiving a car axle, said opening having a continuous sealing lip surrounding it for forming a seal with the said axle, said body also having a continuous raised sealing face on one side thereof for engaging and forming a seal with one wall of the said journal box, and having its peripheral edge terminating in a second continuous sealing face for engaging and forming a seal with an opposite wall of said journal box, the portion of said body intermediate said two sealing faces being so dished that when the dust guard is installed it is placed under sufficient tension to maintain said sealing faces in sealing engagement with said walls.

2. A one-piece non-metallic dust guard for a car journal box, comprising a resilient body having an opening therein for receiving a car axle, said opening having a continuous sealing lip surrounding it for forming a seal with the said axle, said body also having a continuous raised sealing face on one side thereof for engaging and forming a seal with one wall of the said journal box, and having its peripheral edge terminating in a second continuous sealing face for engaging and forming a seal with an opposite wall of said journal box, the planes of said sealing faces being so displaced in their free state as to be forced toward each other when the dust guard is installed whereby the sealing faces are maintained in contact with their respective walls.

CLYDE C. FARMER.